United States Patent
Smith et al.

[11] 3,792,458
[45] Feb. 12, 1974

[54] METHOD AND APPARATUS FOR DETECTING PINHOLES IN SHEET MATERIAL

[75] Inventors: John Edwin Latham Smith, Horsham; Philip Henry Witheridge, Gretton Fields, near Winchcombe, all of England

[73] Assignee: Coal Industry (Patents) Limited, London, England

[22] Filed: Dec. 15, 1971

[21] Appl. No.: 208,341

[30] Foreign Application Priority Data
Jan. 8, 1971 Great Britain .................... 1052/71

[52] U.S. Cl. .................. 340/259, 226/100, 324/54, 340/421
[51] Int. Cl. .......................................... G08b 21/00
[58] Field of Search ............ 340/259, 421; 226/100; 200/61.05, 61.13

[56] References Cited
UNITED STATES PATENTS

| | | | |
|---|---|---|---|
| 2,572,597 | 10/1951 | Connor | 340/421 |
| 2,978,636 | 4/1961 | Fountain | 340/259 |
| 3,270,930 | 9/1966 | Emerson | 340/259 |
| 2,896,196 | 7/1959 | Hartford et al. | 340/259 |

Primary Examiner—Donald J. Yusko
Assistant Examiner—Glen R. Swann, III
Attorney, Agent, or Firm—Stevens, Davis, Miller & Mosher

[57] ABSTRACT

Non-conductive sheet material is tested for holes by applying a liquid under pressure to one side of the material. The liquid is used as one electrode and if any holes are present in the material passes through to make a conductive path with an electrode on the other side of the material. The current passing can be detected and used to operate a marker onto the sheet.

8 Claims, 2 Drawing Figures

PATENTED FEB 12 1974 3,792,458

METHOD AND APPARATUS FOR DETECTING PINHOLES IN SHEET MATERIAL

SUMMARY OF THE INVENTION

This invention relates to a method and apparatus of testing for detecting pinholes in non-electrical conductive sheet material.

When sheet material is being manufactured, it is often necessary for checks to be carried out to ensure that the material is perfect and that no minute pinholes are present. This is particularly necessary when the sheet material is to be used for waterproofing purposes.

Various methods of detecting for pinholes are known. One optical method which is used comprises shining a light onto the sheet and using a light detector on the other side of the sheet to give an indication when light passes through a pinhole in the sheet. An alternative method is one employing a high voltage source, in which electrodes are placed on either side of the sheet and a high voltage is applied across the electrodes. When a pinhole is detected, sparking occurs between the electrodes and an indication of the breakdown is given on a suitable instrument.

The optical method of detection suffers from the disadvantage that the optical parts of the system have to be kept dust-free to ensure that misleading information is not obtained, and in manufacturing conditions the exclusion of dust can be difficult. The electrical system of detection suffers from the disadvantage that when a breakdown occurs a spark is generated between the two electrodes, and this spark can have a damaging effect by enlarging a small hole. Furthermore, if the material is not of a constant thickness, any thinner parts would not be of a strong enough dielectric nature to insulate the electrodes from each other and may break down causing a hole to appear in the material where none existed previously. The use of high voltages in this method is also liable to cause accidents to operators of the equipment.

It is an object of the present invention to provide an improved method of detecting pinholes in electrically non-conductive sheet material which substantially eliminates the above disadvantages.

According to one aspect of the present invention, a method of testing electrically non-conductive sheet material to detect pinholes comprises applying as an electrode an electrically conductive liquid to one side of the sheet material, forcing the conductive liquid against the material, under pressure, to cause it to form a path through the material in any holes therein, locating a second electrode on the other side of the material, applying an electric potential between the electrodes and monitoring any conduction of electricity between the electrodes.

The method also includes passing the material between the electrodes in a continuous manner. The method may also include the step of applying marking to the material whenever conduction occurs.

According to a second aspect of the present invention, apparatus for detecting holes in electrical nonconductive sheet material comprises means for applying an electrically conductive liquid to one side of the sheet material, an electrode situated on the other side of the material, means for connecting an electrical power source to the electrode and the conductive liquid and means for detecting conduction through the sheet.

The means for applying the conductive liquid to the one side of the sheet material may comprise a roller having an absorbent surface impregnated with the conductive liquid. The sheet material may be arranged to be passed over the roller and the roller itself may be driven. A further roller or rollers may be included to guide the sheet material over the first roller and to build up a pressure in the area of the second electrode. The roller may be impregnated by rotating it through a bath of conductive liquid and a still further roller may rotate in this bath against the said roller to remove air from its surface. The liquid itself may conveniently be water. Marking means may be associated with the apparatus to mark the sheet whenever a hole is detected.

BRIEF DESCRIPTION OF THE DRAWINGS

In order that the invention may be readily understood, one embodiment of apparatus for detecting holes in sheet material will now be described by way of example with reference to the accompanying schematic perspective drawing in which.

DETAILED DESCRIPTION

Figure 1:
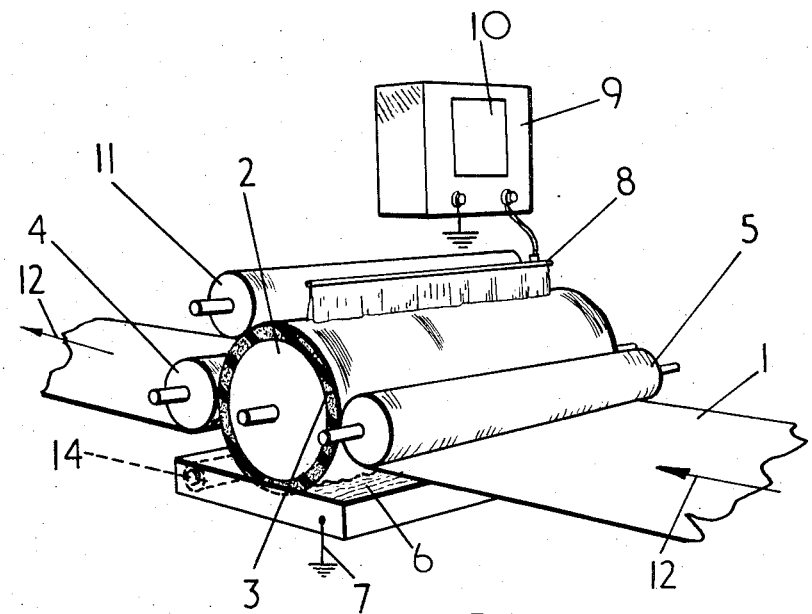
FIG. 1 shows a perspective view of the apparatus and FIG. 2 shows details of the sealing arrangement used at the edge of the main roller of the apparatus.

Referring now to the drawing and particularly to FIG. 1, this shows a sheet of waterproof electrically non-conductive material 1 which has just been manufactured and which is being drawn off the final calendaring rolls (not shown). The sheet 1 passes over a driven roller 2 which has a surface covering of an absorbent sponge material 3 made of polyether foam plastic. The sheet material 1 is guided into contact with approximately half of the circumference of the roller 2 by two further rollers 4,5. The roller 2 rotates with its lower part in a bath of water 6 and this bath is connected to a power source or is earthed through lead 7. A roller 14 (shown dotted) is immersed in the bath 6 and presses against the surface of the roller 2 to exclude air and to assist in recharging the surface of the roller 2 with water.

On top of the sheet material is situated a wire brush type of electrode 8 which extends across the width of roller 2. As can be seen from the drawing, this electrode extends substantially across the whole width of the sheet material 1. The wire brush 8 is connected to one side of an electrical power source 9, the other side of which is connected to lead 7 or is earthed. This power source 9 also includes a detector 10 which includes an electrical trigger circuit and associated amplifier.

A pressure roller 11 bears on the top surface of the sheet material 1 forcing it against the roller 2 and causing liquid in the absorbent sponge material to be squeezed out. This creates a back pressure of liquid in the area of the electrode 8.

In operation, the sheet material 1 is drawn in the direction of the arrows 12 over the roller 2 which is rotated. As roller 2 rotates, the absorbent material 3 soaks up water from the trough 6 into the sponge pores. A voltage of the order of 200 volts DC is applied from power source 9 to the electrode 8. The pressure roller 11 forces the water under pressure beneath the material under the electrode 8 and, if any pinholes are present in the material 1, the water will pass through the holes and complete a conductive path from the electrode 8 through the liquid in the absorbent material 3, the bath 6 and the connection 7. The presence of this conduction will be indicated by the detector 10. A suitable mark can then be made on the top surface of the material to indicate where the hole has occurred. This marking can be done automatically by suitable coupling to the detector 10.

Figure 2:
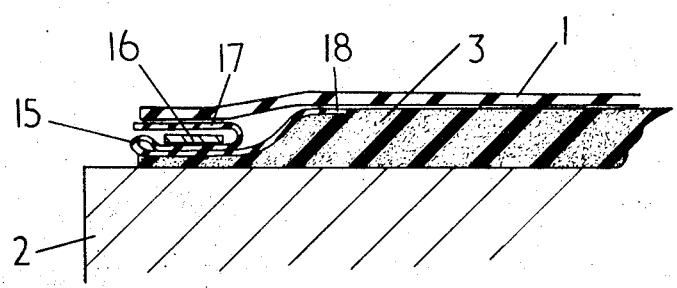

In order to avoid water being squeezed out of the ends of the covering 3 at the edges of the driven roller 2 due to the back pressure created by the roller 11, the ends of the covering 3 can be sealed as shown in FIG. 2 to which reference is now made. A strip of waterproof material 15 is applied to each end of the roller 2 and clamped down firmly on the covering 3 by a metal clamping band 16. One end 17 of the strip of material 15 is then bent back over the band 16 to cover it. The other end 18 of the strip of material 15 extends towards the centre of the drum forming a shaped covering to the edge of the material 3. The strip of material 15 extends for about ¼ inches over the edge of the roller 3 at each end.

The sheet material 1 under test will extend over the whole width of the roller 2 including the whole exposed width of the covering 3 as well as the two edge strips of material 15. In practice the sheet material 1 will not be tested in these edge areas over the banding and thus it will be necessary to trim the edges of the sheet 1 at a subsequent stage. Although this will cause 1½ inches of material to be lost from the width of the sheet 1 this is not necessarily wasteful since it is often necessary to trim the edges on site where the material is being applied to remove small damaged areas. These areas are often caused by handling in transport or by standing rolls of material on end or uneven surfaces.

The material can be constantly monitored, and all pinholes and larger holes can be readily detected irrespective of whether their orientation is straight through or inclined to the sheet. Whenever detection occurs, since only 200 volts d.c. are being used, the pinholes are not enlarged by sparking. Furthermore, weak parts in the sheet material 1 do not suffer from spark puncture unless they are extremely thin and unable to withstand 200 volts d.c. Generally, the apparatus is much safer than other electrical apparatus, since it relies on conduction across the hole rather than sparking through it. The lower voltage used over previous methods ensures operators' safety. In a typical example holes of 0.0048 inches diameter were detected with a current of 1.4 mA to 2.08 mA in a material of thickness 0.06 inches depending on the orientation.

The electrode 8 need not necessarily be of the wire brush type as shown, and any suitable alternative such as a flap-type electrode may be used. Depending on the material being monitored, the electrode may have its pressure varied. Alternatively, the roller 11 may be used as an electrode or another roller in place of electrode 8. The roller 2 will also form a second electrode connecting through the bath 6 and lead 7.

Although in this example water has been used as the conductive liquid, other liquids with a higher conductivity can be used, if required. However, certain of these such as brine may have the disadvantage that they leave salt deposits on the underside of the sheet material. When water is used, it can easily be dried by passing the sheet material through a subsequent set of heated rollers.

We claim:

1. Apparatus for detecting holes in electrically non-conductive sheet material, comprising a pair of electrodes situated one on each side of the sheet material, a power source, the power source being connected to the electrodes and adapted to create a voltage across them, current detection means associated with the electrodes, said current detection means being adapted to monitor the flow of current between said electrodes to indicate the presence of a hole on the sheet material wherein one of the said electrodes is comprised by a conductive liquid adapted to flow through any holes in the sheet material to contact said other electrode and roller means for applying the conductive liquid under pressure to the sheet material.

2. Apparatus for detecting holes in electrically non-conductive sheet material, comprising a pair of electrodes situated one on each side of the sheet material, a power source, the power source being connected to the electrodes and adapted to create a voltage across them, current detection means associated with the electrodes, said current detection means being adapted to monitor the flow of current between said electrodes to indicate the presence of a hole on the sheet material wherein one of the said electrodes is comprised by a conductive liquid adapted to flow through any holes in the sheet material to contact said other electrode, a first roller over which the sheet material passes, biasing means for engaging the sheet material with the first roller, an absorbent coating material on the surface of the first roller and means for impregnating said absorbent coating material with said conductive liquid.

3. Apparatus according to claim 2 in which the means for impregnating the absorbent coating material comprises a bath containing the electrically conductive liquid, the first roller being arranged to run with a part of its surface in the liquid.

4. Apparatus according to claim 3 in which a second roller is located for free rotation in the bath, the second roller abutting the first roller and in operation removing air from the absorbent coating material.

5. Apparatus according to claim 2 in which the biasing means comprises a roller situated on each side of the non-liquid electrode.

6. Apparatus according to claim 2 and including a roller adapted in use to bear on the sheet material and force it against the absorbent coating whereby a back pressure of conductive liquid is created in the area of the non-liquid electrode.

7. Apparatus for detecting holes in electrically insulating sheet material comprising a driven first roller having an absorbent surface coating, a bath of electrically conductive liquid through which the surface passes, an electrode positioned over the first roller, the electrode extending across the width of the first roller and adapted in use to contact one side of sheet material passing over and in contact on its other side with the first roller, a pair of biassing rollers, one roller of the pair being situated on each side of the said electrode and adapted to bias the sheet material in contact with a substantial area of the first roller; a roller extending across the width of the sheet material and being positioned between the leading one of the biasing rollers and the electrode and being adapted in use to create a pressure in the absorbent coating to force conductive liquid into the area of the said electrode, a power source and current detection means, the power source being connected in a circuit to the said electrode and the electrically conductive liquid and the current detection means being also connected in said circuit.

8. Apparatus according to claim 7 and including end sealing means clamped to the edge of the first roller over the absorbent coating.

* * * * *